July 27, 1954  V. F. ZAHODIAKIN  2,684,516
FASTENING DEVICE
Filed July 2, 1953  2 Sheets-Sheet 2
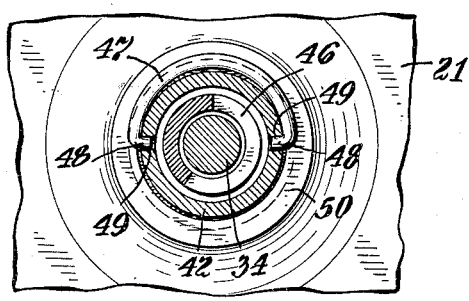
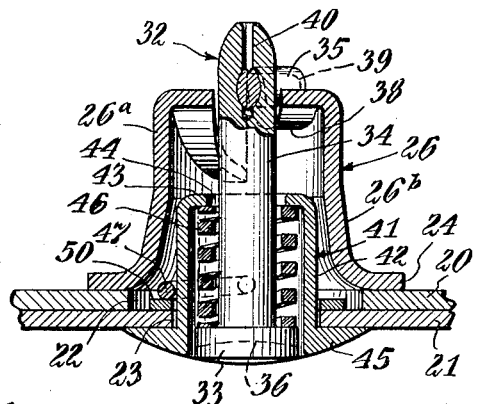
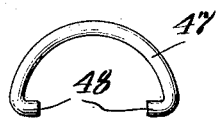
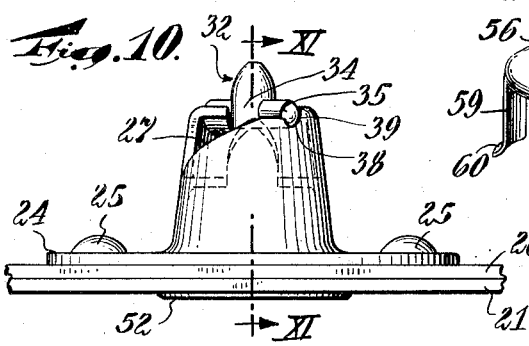
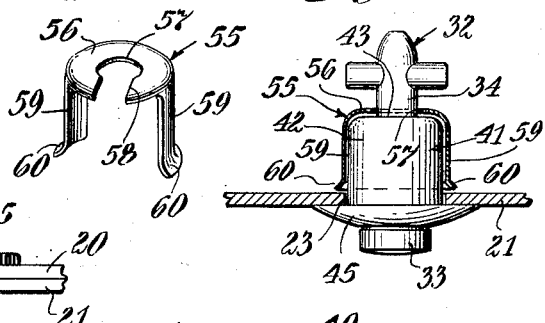
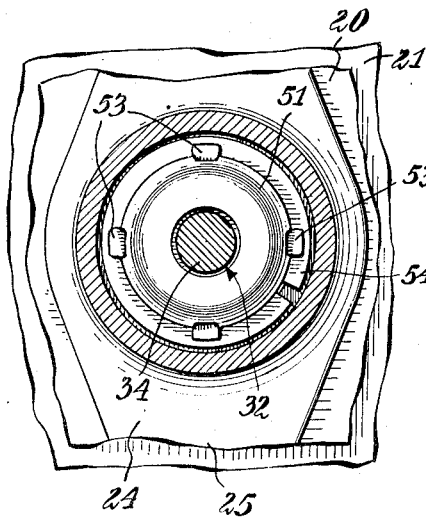
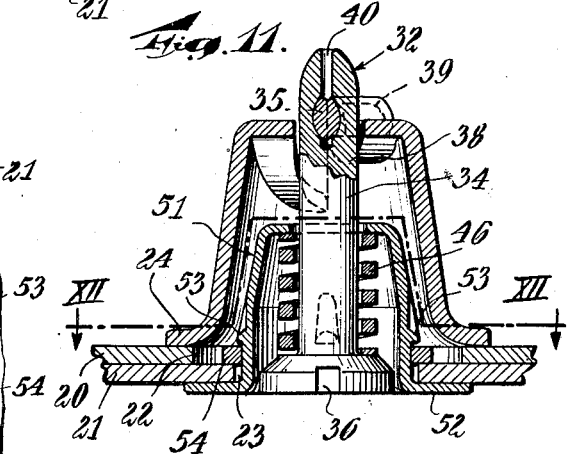
INVENTOR.
VICTOR F. ZAHODIAKIN.
BY
Howard P. King
ATTORNEY

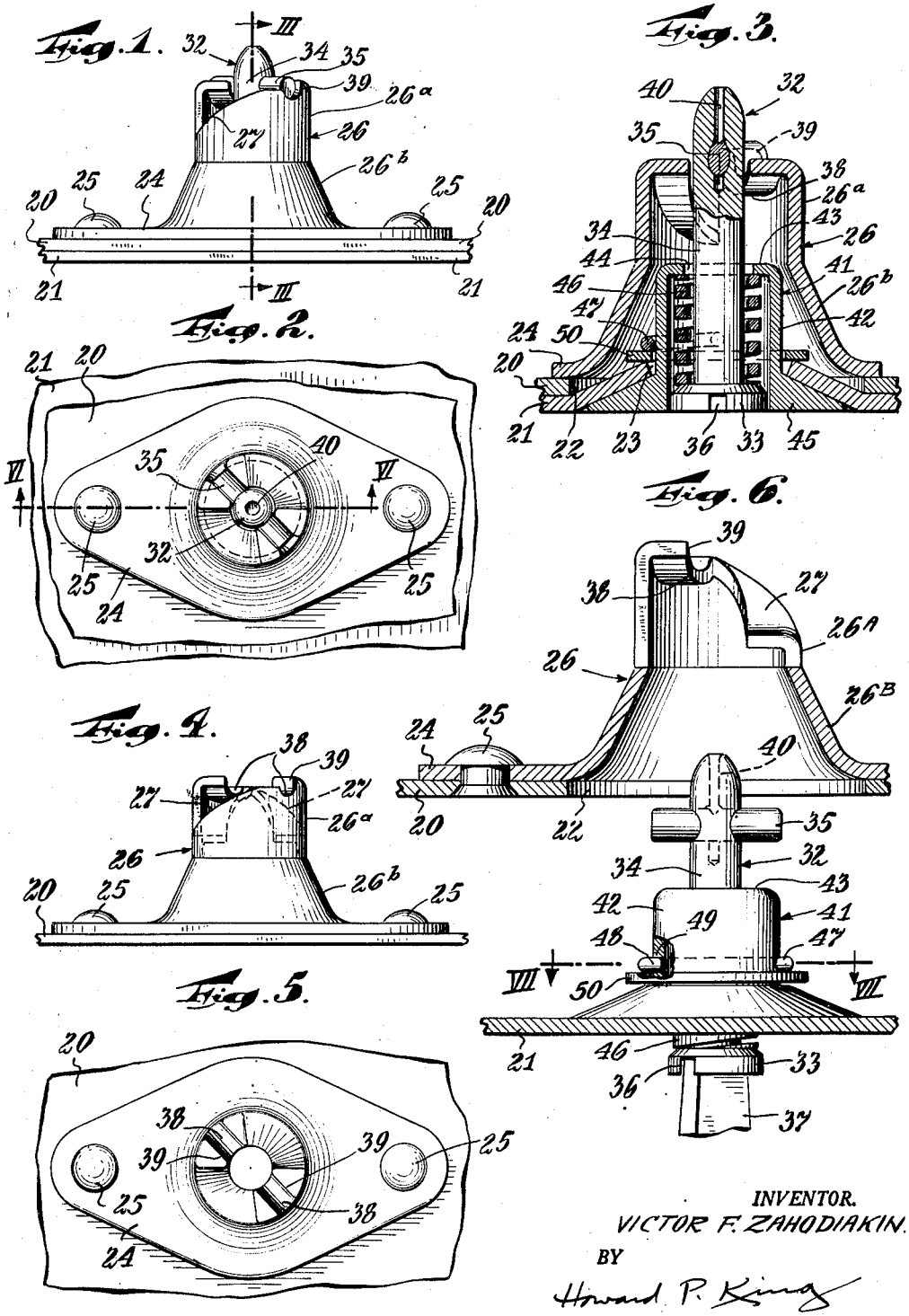

Patented July 27, 1954

2,684,516

UNITED STATES PATENT OFFICE 2,684,516

FASTENING DEVICE

Victor F. Zahodiakin, Summit, N. J.

Application July 2, 1953, Serial No. 365,671

10 Claims. (Cl. 24—221)

This invention relates to a fastening device and more particularly to the rotary type thereof such as commonly employed in military and commercial aircraft and where a quick-operating fastening device is desirable, and has particular reference to a quick-locking stud and socket type of device wherein an interlock is obtained by engaging the stud with its socket by means of twisting the stud and thereby obtaining a compressive clamping of interposed panels or members and for accomplishing other similar uses, such as securing various brackets and other parts which it is desired to hold in juxtaposed position.

The invention contemplates provision of a structure of minimum weight and of minimum envelope size with a maximum strength and maximum hardness of working surfaces, and even though of minimum weight and size, one which is capable of sustaining maximum tensil forces and shear loads, and furthermore, a device which can be assembled or removed from the place of use without any special tools.

Amongst other objects contemplated by the invention, is to provide a precision construction and minimum multiplicity of parts enabling the device to attain and retain accuracy to close tolerances and to readily accommodate substitution of new parts when found necessary or desirable.

Another object of the invention is to provide a device utilizing a stud member having a cross-pin so mounted that it cannot interfere with intended assembly or disassembly of the device and members to which attached by snagging or otherwise.

A further object of the invention is to eliminate the conventional groove for snap-ring retention, and thereby avoid extra thickness required for such a groove, and in this connection to provide an improved means for retaining the grommet and stud assembled with the member being clamped.

Yet another object of the invention is to provide a fastening device which visibly indicates at all times whether or not the device is locked and thereby avoid a false impression that the device is locked, when in reality it is unlocked.

An important and essential object of the invention is to provide a device of great strength and susceptible to minimum wear and having extreme lightness, accomplishing this objective more specifically by providing a device of such construction that it may be made in most part of sheet metal and in particular providing a socket member inclusive of flange, upstanding wall and sloping trackways of material having uniform thickness throughout and conducive to fabrication from high grades of light gauge steel for attainment of rapidity of manufacture and at the same time assuring great strength and accuracy and lightness in weight, as compared to usual die castings and the like.

Other objects of the invention will become apparent to persons skilled in the art to which it appertains as the description proceeds, both by direct recitation thereof and by implication from the context.

Referring to the accompanying drawings, in which like numerals of reference indicate similar parts throughout the several views:

Figure 1 is a side elevation of the fastening device mounted in clamping position on members juxtaposed to each other and clamped thereby;

Figure 2 is a plan of Fig. 1;

Figure 3 is a sectional view on line III—III of Fig. 1;

Figure 4 is an elevation of the socket element in mounted position;

Figure 5 is a plan thereof;

Figure 6 is a sectional view of separated members having the socket and stud elements of my invention thereon and about to be assembled for clamping the members together;

Figure 7 is a cross section of the stud element on line VII—VII of Fig. 6;

Figure 8 is a sectional view similar to Fig. 3 and showing a modified construction for use with members not having stud-receiving dimples;

Figure 9 is a plan of the bail-shaped retainer used in the constructions above-identified;

Figure 10 is an elevation of a further modified construction of device for use with members not having dimples;

Figure 11 is a sectional view on line XI—XI of Fig. 10;

Figure 12 is a cross section on line XII—XII of Fig. 11;

Figure 13 is a perspective view of a modified construction of retainer; and

Figure 14 is an elevational view of a stud element in a member and showing the modified retainer of Fig. 13 in its assembled relation as part of said element.

In the specific embodiment of the invention illustrated in said drawings, the reference numerals 20, 21 designate juxtaposed members adapted to be clamped together in overlapped position. For convenience in making distinguishing reference thereto, the members will be arbitrarily referred to as inner member 20 and outer member 21. The device of this invention is directed primarily to military aircraft of high speeds, such as jet planes, which are capable of sonic and supersonic speeds. In such planes the external panels or members must be made to fit very precisely and it is a present-day normal specification for the said panels or members not to project one over another to exceed .005" and in construction of such planes the fastening devices to meet army-navy specifications must withstand very severe tests requiring maximum tensil strength, maximum resistance to shear load, and still remain within limited requirements as to size, weight and other restrictions and limitations. Imposed limitations on the size of holes permitted in the members and as to projection of any part of the device beyond the outer surface of the members adds heavily to the problem. Furthermore, in view of the fact that some armed-forces planes use many thousands of the fastening devices per aeroplane, the weight thereof becomes a great factor and must be kept as low as possible consistent with provision of a strong, precision, and otherwise satisfactory construction.

The members to be secured are pre-punched with holes 22, 23 respectively, which are intended to axially register when the members are assembled, the hole 23 of the outer member, however, being smaller than the hole 22 in the inner member. To avoid projection of any part of the device beyond the normal surface of the member 21, the material marginally around the outer hole 23 may be dimpled as shown in Fig. 3 with the dimple protruding inwardly of the hole 22 of the inner member.

The socket element of the device is secured, as by a basal flange or face-plate 24 constituting an integral part thereof and by rivets 25, to inner member 20. Upstanding from said basal flange is a hollow body of revolution having a side wall 26 the upper end portion 26a of which may be cylindrical and the lower portion 26b of which may flare from the cylindrical portion toward the basel flange 24 as shown in Figures 1 to 3, or may be entirely frusto-conical as may be seen in Fig. 11. In any event, the hollow body side wall 26 is attached through the agency of the basal flange and rivets substantially coaxial to the hole 22 of inner member 20. The inside diameter of the cylindrical portion of said side wall preferably approximates the diameter of the hole 23 in the outer member 21.

The end of the hollow body side wall 26 remote from the basal flange, terminates with an end wall constituted as a pair of opposite and inwardly directed progressively advancing or sloping trackways 27 in a common direction of rotation. The bottom ends of these trackways are located on a common diameter substantially at the junction of the upper end of the flared lower portion 26b and the lower end of the cylindrical upper portion 26a of side wall 26. Each sloping trackway 27, as seen in plan, extends for substantially 180°, one opposite to the other and at the axial plane therebetween the starting end of one trackway is well below the finish end of the other trackway, providing ample space for a cross-pin, subsequently described, to pass therebetween.

It is now opportune to state that the socket element above-described is fabricated from sheet steel of uniform thickness by drawing, cutting and forming with appropriate dies, so that the completed socket element has the same thickness of material throughout. Exactitude of construction, dimensions, clearances and other specification requirements may consequently be fulfilled. The use of sheet steel makes it possible to case carburize the socket element approximately to a depth of .008" to .015" and then harden the same to a maximum surface hardness, leaving the portion of the metal buried under the hardened surface advantageously somewhat softer and resistive to cracking. As a result, the device is stronger with less metal than heretofore possible, and is much lighter in weight and resists wear for a useful life many times that of prior art devices. These several advantages are cumulative in production of a device far superior to any heretofore available.

Cooperative with the socket element is a stud element or assembly including a stud 32 having a head 33 and a shank 34, said stud having an overall length enabling the same to extend from the outer surface level of the outer member 21 and through the entire length of the socket element. Near the upper end of the stud shank 34 there is a cross-pin 35 or other diametric projection adapted to engage upon and across said trackways 27 and ride up or down said trackways by appropriate rotation of the stud, for which purpose the stud head is shown provided with a kerf 36 for reception of a screw driver or other tool 37.

It is now convenient to call attention to the fact that the trackways 27 extend inwardly from the socket element side wall just far enough to leave a center passageway for the stud shank 34 which will be guided coaxially through the upper portion of the hollow body side wall by engagement with the inwardly directed edges of said trackways. Furthermore said trackways constitute in part the upper end of said side wall and in part overlie the thickness of said wall. The ends of the cross-pin 35 riding on the trackways exert almost direct pressure upon and longitudinally of said side wall.

At the upper end of each trackway there is a declivity 38 followed by an upwardly projecting stop 39 terminating said trackway. The declivities are of segmental cylindrical formation and the axis thereof is a true diameter of the socket element which will coincide with the axis of the cross-pin 35 when the cross-pin is in a seated position in said declivities. Said declivities 38 are axially open at both ends to permit free axial or longitudinal floating of the cross-pin when seating therein, thereby preventing the cross-pin from an axial misalignment and enabling it to nest at both projecting ends thereof in said declivities, as a consequence of which the axial load will be uniformly distributed on both ends of the cross-pin.

It is desirable that the cross-pin shall be permanently secured in the stud shank and be prevented from sliding with respect thereto. As one means for accomplishing this purpose, the stud shank 34 may have a hole 40 drilled longitudinally thereof to and past the location of the pin before the pin is applied. Then, after the cross-pin is properly placed, a center-punch or other tool may be introduced into said hole and the metal of the pin peened to create a burr or protrusion over the pin surface or other gripping action of the pin metal where crossing said hole 40.

A spring loading is provided for the stud, the primary purpose therefor being to retain the clamped members under constant predetermined tension and to retain the transverse projection or cross-pin 35 seated in said declivities 38 until intentionally released. In carrying out this feature of the invention, I provide a one-piece construction of grommet 41 having somewhat the shape of an inverted cup so as to provide a hollow body with a true cylindrical uninterrupted bore and side wall 42 and a cross wall 43. The outside surface of the grommet is a concentric surface with the inside bore of the grommet. A hole 44 considerably larger than the diameter of stud 32 is provided centrally of this cross wall so that the stud may extend loosely therethrough and tilt or be tilted as required in service. The other end of the grommet 41 from said cross wall is entirely open, but has an external peripheral rim 45. When the device is placed in service, the hollow body side wall of the grommet is inserted, from the outside of the outer member 21 to be clamped, through hole 23 with which it has a reasonably free fit. Rim 45 then engages the margin of said member around the hole and retains the grommet from further inward displacement. According to the showing in Figs. 1 to 6, said rim 45 has a tapered under surface to fit the dimple made in member 21 around hole 23, so that, with the rim made outwardly flat, it will seat entirely in the dimple and be flush with the outer surface of said member. However, if a dimple is not provided in the member being clamped, the underside of the rim 45 may be flat and engage the flat marginal surface of the member around the hole as shown in Figures 8 and 11.

A spring 46 is applied to and encircles the part of the stud within the grommet. It will be understood that the grommet 41 is assembled with the spring and the stud 32 before cross-pin 35 is introduced and that introduction of the cross-pin keeps the stud from becoming separated from the grommet. Said spring bears at one end against the under shoulder of the stud head 33 and bears at its other end against the cross-wall 43 of the grommet. The spring dimensions and action are sufficient to make the stud head protrude from the grommet when the stud is in its unlocked condition, and the protruding head gives positive indication that the device is not locked. However, the dimensions are made such that when the stud is rotated to advance the cross-pin 35 up the trackway 27 and into the declivities 38, the outer end of the stud head 33 will then be flush with the outer face of rim 45 and definitely indicate the device is locked.

As it is important that the stud element or assembly, which comprises stud 32, grommet 41 and spring 46, shall remain in place in member 23 even when unlocked, I provide a retainer 47 at the back side of said member and mounted on the grommet. The particular retainer shown in use in Figs. 3, 6, 7 and 8 and shown in detail in Fig. 9 comprises a half circle snap ring having its ends 48 bent inwardly toward each other on a common diameter. These ends preferably have lengths substantially equal to the thickness of material of which the side wall 42 of the grommet is made. Appropriately located diametrically, opposite holes 49 are made in the grommet to receive said ends which, by virtue of resiliency of the retainer 47 can be snapped thereinto. This retainer accordingly requires no groove and no extra thickness of metal to provide for a groove, such as has been heretofore necessary. If so desired, a washer 50 may be included between the retainer and member 23.

In addition to what has been said above, it may be pointed out that the construction of Fig. 8, wherein the grommet rim 41 has been shown engaging a flat margin of outer member 21 around hole 23, utilizes a rounded configuration for the outer face of the rim. The outer end of the stud head 33 is correspondingly rounded so that the rim and head surfaces are substantially in rounded continuation one to the other and offer a minimum of resistance to air flow thereacross.

Figures 10, 11 and 12 disclose another modification of the invention of commercial type in which the socket element is again formed of sheet steel of uniform thickness at all parts of the socket, and has a flanged side wall and trackways. The side wall of this modification comprises a frusto-conical formation for the full length of the socket element, but in all other respects is similar to the other socket elements herein described. While I prefer to use sheet steel for the socket elements, if no high stresses have to be considered, another material may be substituted for the steel, such as aluminum, and the material may be treated electrochemically to obtain surface hardness. However, I may say as to Figs. 10–12, that this type of device, by virtue of its construction, will not be suitable for present standard military specifications for use on high speed airplanes and, therefore, would be primarily adapted for commercial plane applications. The main feature of this modification is directed to provision of a socket element the entire length of the side wall of which is of conical formation, the cone reducing in diametrical size uniformly in transition from the flange toward the trackways. It should be noted that the trackways begin in proximity to the middle of the axial dimension of the conical body and as the internal and external dimension of the cone gradually reduces, and when the cross-pin rides upon the trackways and rises from approximately the middle of the socket element toward the top of the trackways, the ends of the cross-pin move constantly closer toward the outside surface of the side wall of the socket element and finally, when the cross-pin reaches its final position where it seats in the declivities 38, it will overlie, at least in part, said side wall of the cone. Consequently, the axial load will be applied directly on the side wall of the socket element and thereby prevent said load from bending the walls forming the declivities, and thus the socket element is enabled to withstand great axial loads. Although this construction is not suitable for rigid military specifications dimensionally, because of its construction, it provides, however, an excellent construction for commercial application or much slower speed airplanes than the military aircraft, such as cargo-carrying planes, helicopters and the like, and can be made of lighter material with strength comparable to that of the other embodiments herein disclosed.

The showing of Figures 10 to 12 provides a rim 45 on the end of the grommet 51 obtained by flaring the sheet metal outwardly perpendicular to the axis of the grommet in the form of a peripheral flange 52. This construction retains the same thickness of sheet metal for the entire grommet, whereas in the preceding construction herein described the metal undergoes end compression to provide for the extra thickness needed for the special types of rim shown. Where acceptable under specification requirements, therefore, the even-thickness flange type of rim is more readily manufactured and therefore more economical. In all constructions shown, the grommet may be made from sheet steel of uniform thickness, and in most part the grommet is essentially of the same thickness. If so desired, the grommet may be case carburized and hardened as explained above for the socket element.

According to the showing in Figures 11 and 12, a modified retainer from that previously described may be employed. In this instance the grommet 51 is frusto-conical for a major part of its length below its end cross-wall 43. The side wall of the grommet, at a proper location thereon, is swaged by a die and provides a plurality of shoulders 53 at intervals around the grommet spaced from and facing downwardly toward flange 52. A split snap ring 54 can be slid over said shoulders from the smaller end of the grommet to snap under the shoulders and be held from retractive displacement thereby. The ring 54 overlies the margin of hole 23 of outer member 21, and being held by said shoulders, retains the grommet from dropping out of said hole when the device is unlocked.

A still further modification of retainer is shown in Figures 13, 14, wherein is shown outer member 21 having a cylindrical type of grommet therein, and for purposes of illustration, cylindrical grommet 41 as heretofore shown and described with respect to Fig. 8 has been arbitrarily selected. The stud element, of which stud 32, cross-pin 35 and grommet 42 are parts, is shown in its unlocked condition, so that the spring loading projects the head 33 of said stud out of the grommet to be visible outside of rim 45 thereof. The retainer, designated in general by numeral 55 in Figs. 13, 14, comprises a split ring 56 of resilient material having a center hole 57 adapted to fit the shank of stud 32. The split of said ring comprises a radial slot 58 of less width than the diameter of said stud shank so that the ring has to be sprung onto or off of the stud, and therefore, after assembly of the stud element in place in member 21, said retainer remains in place to perform its function. From the outer periphery of said split ring are a plurality of arms paralleling the side wall of the grommet and having lipped ends 60 for engaging the inside surface of member 21 at the margin of hole 23 provided for reception of the stud element. Since the split ring 56 is positioned on the stud between the cross-pin 35 and the grommet 41, the stud element will be retained in the member 21 when unlocked. This construction again exemplifies the generic disclosure of a retainer capable of use with a grommet of sheet material not requiring extra thickness of the grommet material for a groove to receive the retainer as prevalent in the prior art. Consequently all constructions herein shown provide for minimum diameter of grommet and of the hole 23 in outer member 21.

I claim:

1. A fastening device for juxtaposed members to be clamped thereby, comprising interengaging stud and socket elements, said stud element having a cross-pin with projecting ends, and the socket element having advancing trackways upon which to receive and advance said projecting ends, said socket element providing a frusto-conical side wall and said trackways being integral with and in part terminating the smaller end of said conical wall and in part projecting radially inward of said side wall, and said pin having a length substantially equal to the inside diameter of the conical side wall where the trackways begin whereby said projecting ends of said pin advanced to the smaller end of the conical wall on said trackways will overlie said side wall thereat.

2. A fastening device for juxtaposed members to be clamped thereby, comprising interengaging stud and socket elements, said stud element having a stud and a cross-pin with a projecting end, and the socket element having an advancing trackway upon which to receive and advance said projecting end, said socket element having a conical side wall for the full length thereof, said trackway beginning at a larger part of the conical side wall and terminating at the smaller end thereof, and said trackway being integral with and in part terminating the smaller end of said conical wall and in part projecting radially inward of said wall, and said pin having a length substantially equal to the inside diameter of the conical side wall where the trackways begin, whereby said projecting end of said cross-pin upon being advanced to the smaller end of the conical wall on said trackway constantly moves toward the outside surface of the smaller end of the conical wall and when said end of the cross-pin reaches the smaller end of said conical wall it directly overlies the conical wall thereat and is adapted thereby to apply the direct axial load from the stud of the stud element to the underlying end of said wall whereby said device is adapted to resist great axial loads without tendency to break or bend said trackways.

3. A socket element for a stud and socket fastening device, comprising a hollow body providing an annular side wall having a longitudinal axis, a pair of rigid trackways directed radially inward of and transverse to said side wall and integral therewith, said trackways advancing in both a circumferential and a longitudinal direction, each trackway having a starting end and a terminating end substantially 180° apart and at spaced distances longitudinally of the hollow body, and with the starting end of each trackway substantially in the same radial plane as the terminating end of the other trackway.

4. A socket element for a stud and socket fastening device, wherein the stud provides diametrical pin projecting therefrom, comprising a hollow sheet metal body providing an annular side wall having a longitudinal axis, a pair of rigid trackways at a forward end and transverse to said side wall and integral therewith and terminating said forward end, said trackways being of sheet metal and projecting radially inward of said body and advancing both in a circumferential direction and a longitudinal direction from a starting end to a terminating end, projection of the inner peripheral edges of the trackways on a plane being a complete circle and the projection of the outer peripheries of the trackways being arcs eccentric to said axis and with the shortest eccentric distance from the arc to said axis being substantially equal one half the length of the stud pin, said end of the arc being at said terminating end of the wall and said terminating end being bent longitudinally outward and constituting a radial stop, the far end of said stop of each trackway being in substantially the same radial plane as but further advanced longitudinally of said axis than the starting end of the other trackway.

5. An integral sheet metal socket element for a stud and socket type of fastening device, wherein the stud provides a diametrical pin that projects therefrom, comprising an attaching flange, a rigid hollow body upstanding from and integral with said flange and constituted as a body of revolution about an axis with uniform angularity thereto throughout the height of said body, said body being hollow and having a rigid side wall and a rigid end wall, said end wall comprising a pair of rigid inwardly projecting trackways each sloping from a low end to a high end of which the high end is closest to the axis, and projection of the inner peripheral edges of the trackways on a plane being a complete circle and the projection of the outer peripheries of the trackways being arcs eccentric to said axis with the distance of the end of the arc nearest said axis being substantially equal half of the length of the stud pin, and the high end and low end of successive trackways being substantially in the same axial plane with each other.

6. An integral sheet metal socket element for a stud and socket type of fastening device, comprising an attaching flange, a rigid hollow frusto-conical body upstanding from and integral with said flange and constituted as a body of revolution about an axis, said body being hollow and having a rigid side wall and a rigid end wall, said end wall comprising a pair of rigid trackways projecting inwardly from said side wall and each sloping from a low end to a high end, and each trackway having an indentation next to its high end followed thereafter by a stop terminating said high end of the trackway, and the high end and low end of successive trackways being substantially in the same axial plane with each other and with the high end of the periphery of said trackway closer to the body axis than the low end.

7. A socket element for a stud and socket type of fastening device, comprising an attaching flange, a rigid hollow body upstanding from and integral with said flange and constituted as a body of revolution about an axis, said body being hollow and having a uniformly sloping rigid side wall and a rigid end wall, said end wall comprising a pair of rigid trackways projecting inwardly of the side walls and each sloping from a low end to a high end, and each trackway having an indentation next to its high end followed thereafter by a stop terminating said high end of the trackway, and the high end and low end of said successive trackways being substantially in the same axial plane with each other, said flange, body and trackways inclusive of said indentations and stop all being integrally die-formed from uniform thickness sheet steel of low carbon content and all having uniform thickness and case-carburized and hardened and thereby having a maximum surface hardness.

8. A fastening device for juxtaposed members to be clamped thereby, comprising interengaging stud and socket elements, said stud element having a cross-pin with projecting ends, and the socket element having advancing rigid cam surface trackways upon which to receive and advance said projecting ends, said socket element providing a frusto-conical side wall and said trackways being integral with and in part terminating the smaller end of said conical wall and in part projecting radially inward of said side wall, and said pin having a length substantially equal to the inside diameter of the conical side wall where the trackways begin whereby said projecting ends of said pin advanced to the smaller end of the conical wall on said trackways will overlie said side wall thereat, said cam surfaces being formed at right angle in relation to the axis of the receptacle, and said cam surfaces projecting at a substantial angle with annular wall substantially throughout the 360° of said external circumference and with the starting and ending of each trackway substantially 180° apart.

9. A fastening device for juxtaposed members to be clamped thereby, comprising interengaging stud and socket elements, said stud element having a cross-pin with projecting ends, and the socket element having advancing rigid trackways upon which to receive and advance said projecting ends, said socket element providing a frusto-conical side wall and said trackways being integral with and in part terminating the smaller end of said conical wall and in part projecting radially inward of said side wall, and said pin having a length substantially equal to the inside diameter of the conical side wall where the trackways begin whereby said projecting ends of said pin advanced to the smaller end of the conical wall on said trackways will overlie said side wall thereat, said projecting ends of the cross-pin adapted to provide in operation and under tension a full line contact over the inwardly projecting trackways and the annular wall of the receptacle.

10. A fastening device for juxtaposed members to be clamped thereby, comprising interengaging stud and socket elements, said stud element having a cross pin with ends projecting predetermined distances from the stud, and the socket element having a side wall with inwardly projecting rigid and spirally advancing trackways at a forward end thereof upon which to receive and advance said projecting ends, the beginning and ending of successive trackways being substantially in a common axial plane, said cross pin having a length substantially equal to the diameter of the trackway and wall at the advanced ends of said trackways and wall and the pin thereby adapted to overlie both the said wall and the trackways.

References Cited in the file of this patent

UNITED STATES PATENTS

| Number | Name | Date |
| --- | --- | --- |
| 1,775,042 | Lemoine | Sept. 2, 1930 |
| 2,100,816 | Purinton | Nov. 30, 1937 |
| 2,174,030 | Boyer | Sept. 26, 1939 |
| 2,186,746 | Albin | Jan. 9, 1940 |
| 2,205,863 | Rauch | June 25, 1940 |
| 2,239,125 | Summers | Apr. 22, 1941 |
| 2,378,122 | Barlow | June 12, 1945 |
| 2,385,180 | Allen | Sept. 18, 1945 |
| 2,428,077 | Herold | Sept. 30, 1947 |
| 2,486,670 | Nigg | Nov. 1, 1949 |
| 2,527,783 | Zahodiakin | Oct. 31, 1950 |
| 2,533,115 | Huelster | Dec. 5, 1950 |
| 2,640,244 | Becker | June 2, 1953 |

FOREIGN PATENTS

| Number | Country | Date |
| --- | --- | --- |
| 816,501 | France | Aug. 10, 1937 |
| 875,520 | France | Sept. 25, 1942 |
| 560,128 | Great Britain | Mar. 21, 1944 |